US011593717B2

(12) United States Patent
Bhogal et al.

(10) Patent No.: US 11,593,717 B2
(45) Date of Patent: Feb. 28, 2023

(54) SYSTEM AND METHOD FOR CLASSIFICATION OF AMBIGUOUS OBJECTS

(71) Applicant: June Life, Inc., San Francisco, CA (US)

(72) Inventors: Nikhil Bhogal, San Francisco, CA (US); Nishit Kumar, San Francisco, CA (US); Jithendra Paruchuri, San Francisco, CA (US)

(73) Assignee: June Life, Inc., San Francisco, CA (US)

( * ) Notice: Subject to any disclaimer, the term of this patent is extended or adjusted under 35 U.S.C. 154(b) by 89 days.

(21) Appl. No.: 17/216,036

(22) Filed: Mar. 29, 2021

(65) Prior Publication Data
US 2021/0303929 A1    Sep. 30, 2021

Related U.S. Application Data

(60) Provisional application No. 63/025,139, filed on May 14, 2020, provisional application No. 63/001,200, filed on Mar. 27, 2020.

(51) Int. Cl.
*G06N 20/20* (2019.01)
*G06F 18/214* (2023.01)
(Continued)

(52) U.S. Cl.
CPC ......... *G06N 20/20* (2019.01); *G06F 18/2148* (2023.01); *G06F 18/2163* (2023.01);
(Continued)

(58) Field of Classification Search
CPC ........ G06N 20/00; G06N 7/005; G06N 5/003; G06N 20/20; G06N 7/02; G06N 3/08;
(Continued)

(56) References Cited

U.S. PATENT DOCUMENTS 3,453,997 A    7/1969    Klepzig
3,911,893 A    10/1975   Baker et al.
(Continued)

FOREIGN PATENT DOCUMENTS

CN    1900858 A    1/2007
CN    101504158 A   8/2009
(Continued)

OTHER PUBLICATIONS

Xu, Multiple Clustered Instance Learning for Histopathology Cancer Image Classification, Segmentation and Clustering, 2012, IEEE (Year: 2012).*
(Continued)

*Primary Examiner* — Alex Kok S Liew
(74) *Attorney, Agent, or Firm* — Jeffrey Schox; Diana Lin

(57) ABSTRACT

The method for classifying ambiguous objects, including: determining initial labels for an image set; determining N training sets from the initially-labelled image set; training M annotation models using the N training sets; determining secondary labels for each image of the image set using the M trained annotation models; and determining final labels for the image set based on the secondary labels. The method can optionally include training a runtime model using images from the image set labeled with the final labels; and optionally using the runtime model.

17 Claims, 8 Drawing Sheets

(51) Int. Cl.
    *G06F 18/24*     (2023.01)
    *G06F 18/21*     (2023.01)
    *G06V 10/774*    (2022.01)
    *G06V 10/776*    (2022.01)
    *G06N 3/08*      (2023.01)
    *G06V 20/68*     (2022.01)

(52) U.S. Cl.
    CPC ............ *G06F 18/24* (2023.01); *G06V 10/774* (2022.01); *G06V 10/776* (2022.01); *G06N 3/08* (2013.01); *G06V 20/68* (2022.01)

(58) Field of Classification Search
    CPC ............ G06N 3/04; G06N 5/02; G06N 5/022; G06N 20/10; G06N 3/0445; G06N 3/0454; G06N 3/082; G06N 3/084; G06V 10/40; G06V 10/761; G06V 2201/09; G06V 30/19147; G06V 30/19167; G06V 30/19173; G06V 30/413; G06V 30/416; G06V 10/764; G06V 10/7625; G06V 20/698; G06V 20/13
    See application file for complete search history.

(56) References Cited

U.S. PATENT DOCUMENTS

| | | |
|---|---|---|
| 4,415,790 A | 11/1983 | Diesch et al. |
| 5,154,940 A | 10/1992 | Budzyna et al. |
| 5,170,024 A | 12/1992 | Hanatani et al. |
| 5,360,965 A | 11/1994 | Ishii et al. |
| 5,361,681 A | 11/1994 | Hedstroem et al. |
| 5,412,448 A | 5/1995 | Kunishige |
| 5,520,095 A | 5/1996 | Huber et al. |
| 5,546,475 A | 8/1996 | Bolle et al. |
| 5,981,916 A | 11/1999 | Griffiths et al. |
| 6,011,242 A | 1/2000 | Westerberg |
| 6,060,701 A | 5/2000 | McKee et al. |
| 6,310,964 B1 | 10/2001 | Mohan et al. |
| 6,359,270 B1 | 3/2002 | Bridson |
| 6,384,384 B1 | 5/2002 | Connolly et al. |
| 6,759,635 B2 | 7/2004 | Lile |
| 6,821,016 B2 | 11/2004 | Sato et al. |
| 6,856,247 B1 | 2/2005 | Wallace |
| 6,862,494 B2 | 3/2005 | Hu et al. |
| 7,013,661 B2 | 3/2006 | Gatling et al. |
| 7,102,107 B1 | 9/2006 | Chapman |
| 7,150,891 B2 | 12/2006 | Greiner et al. |
| 7,445,381 B2 | 11/2008 | Rund et al. |
| 7,516,692 B2 | 4/2009 | Pirkle et al. |
| 7,566,168 B2 | 7/2009 | Rund et al. |
| 7,663,502 B2 | 2/2010 | Breed |
| 7,845,823 B2 | 12/2010 | Mueller et al. |
| 7,973,642 B2 | 7/2011 | Schackmuth et al. |
| 8,091,543 B2 | 1/2012 | Baumann et al. |
| 8,193,474 B2 | 6/2012 | Harris |
| 8,426,777 B2 | 4/2013 | Elston et al. |
| 8,555,776 B2 | 10/2013 | Debord et al. |
| 8,766,144 B2 | 7/2014 | McLoughlin et al. |
| 8,931,400 B1 | 1/2015 | Allen |
| 9,017,751 B2 | 4/2015 | Rauh |
| 9,041,799 B2 | 5/2015 | Bielstein |
| 9,069,340 B2 | 6/2015 | Minvielle |
| 9,149,058 B2 | 10/2015 | Bilet et al. |
| 9,269,133 B2 | 2/2016 | Cho et al. |
| 9,414,444 B2 | 8/2016 | Libman et al. |
| 9,460,633 B2 | 10/2016 | Minvielle |
| 9,494,322 B2 | 11/2016 | Luckhardt et al. |
| 9,528,972 B2 | 12/2016 | Minvielle |
| 9,564,064 B2 | 2/2017 | Minvielle |
| 9,644,847 B2 | 5/2017 | Bhogal et al. |
| 9,927,129 B2 | 3/2018 | Bhogal et al. |
| 9,933,166 B2 | 4/2018 | Matarazzi et al. |
| 10,024,736 B2 | 7/2018 | Nivala et al. |
| 10,057,946 B2 | 8/2018 | Mills et al. |
| 10,092,129 B2 | 10/2018 | Jenkins et al. |
| 10,559,186 B2 | 2/2020 | Allen |
| 2002/0005406 A1 | 1/2002 | Fukunaga et al. |
| 2003/0047553 A1 | 3/2003 | Patti et al. |
| 2003/0139843 A1 | 7/2003 | Hu et al. |
| 2004/0104222 A1 | 6/2004 | Lee |
| 2005/0046584 A1 | 3/2005 | Breed |
| 2005/0133019 A1 | 6/2005 | Kim et al. |
| 2006/0185523 A1 | 8/2006 | Wiedemann et al. |
| 2006/0218057 A1 | 9/2006 | Fitzpatrick et al. |
| 2006/0219234 A1 | 10/2006 | Larsen |
| 2007/0001012 A1 | 1/2007 | Kim et al. |
| 2007/0007279 A1 | 1/2007 | Chun et al. |
| 2007/0029306 A1 | 2/2007 | Chun et al. |
| 2007/0042091 A1 | 2/2007 | Rund et al. |
| 2007/0125760 A1 | 6/2007 | Kim et al. |
| 2007/0215599 A1 | 9/2007 | Kahler |
| 2008/0029078 A1 | 2/2008 | Baumann et al. |
| 2008/0032018 A1 | 2/2008 | Garniss et al. |
| 2008/0120188 A1 | 5/2008 | Mobley et al. |
| 2008/0193614 A1 | 8/2008 | Greiner et al. |
| 2009/0134151 A1 | 5/2009 | Bogatin et al. |
| 2009/0274805 A1 | 11/2009 | Schonemann |
| 2010/0006558 A1 | 1/2010 | McLoughlin et al. |
| 2010/0021606 A1 | 1/2010 | Rauh |
| 2010/0124378 A1* | 5/2010 | Das ............. G06F 16/583 382/225 |
| 2010/0134620 A1 | 6/2010 | Bielstein |
| 2010/0138075 A1 | 6/2010 | Boer et al. |
| 2010/0145483 A1 | 6/2010 | McGonagle et al. |
| 2010/0147823 A1 | 6/2010 | Anderson et al. |
| 2010/0320189 A1 | 12/2010 | Buchheit |
| 2011/0002677 A1 | 1/2011 | Cochran et al. |
| 2011/0022211 A1 | 1/2011 | McIntyre et al. |
| 2011/0123689 A1 | 5/2011 | Luckhardt et al. |
| 2011/0127252 A1 | 6/2011 | Yu et al. |
| 2011/0284518 A1 | 11/2011 | Elston et al. |
| 2012/0017882 A1 | 1/2012 | Kitaguchi et al. |
| 2012/0038549 A1 | 2/2012 | Man et al. |
| 2012/0076351 A1 | 3/2012 | Yoon et al. |
| 2012/0099761 A1 | 4/2012 | Yoon et al. |
| 2012/0100269 A1 | 4/2012 | Polt |
| 2012/0125921 A1 | 5/2012 | Shim et al. |
| 2012/0170247 A1 | 7/2012 | Do |
| 2012/0288595 A1 | 11/2012 | Randall et al. |
| 2013/0052310 A1 | 2/2013 | Stanford |
| 2013/0084369 A1 | 4/2013 | Smrke |
| 2013/0092680 A1 | 4/2013 | Cartwright et al. |
| 2013/0092682 A1 | 4/2013 | Mills et al. |
| 2013/0171304 A1 | 7/2013 | Huntley |
| 2013/0176116 A1 | 7/2013 | Jung et al. |
| 2013/0186887 A1 | 7/2013 | Hallgren et al. |
| 2013/0269539 A1 | 10/2013 | Polt |
| 2013/0277353 A1 | 10/2013 | Joseph et al. |
| 2013/0302483 A1 | 11/2013 | Riefenstein |
| 2013/0306052 A1 | 11/2013 | Price et al. |
| 2013/0306627 A1 | 11/2013 | Libman et al. |
| 2014/0026762 A1 | 1/2014 | Riefenstein |
| 2014/0199455 A1 | 7/2014 | Bilet et al. |
| 2014/0203012 A1 | 7/2014 | Corona et al. |
| 2014/0232869 A1 | 8/2014 | May et al. |
| 2014/0297467 A1 | 10/2014 | Soller et al. |
| 2014/0334691 A1* | 11/2014 | Cho ............. G06Q 30/0631 382/110 |
| 2015/0056344 A1 | 2/2015 | Luckhardt |
| 2015/0136760 A1 | 5/2015 | Lima et al. |
| 2015/0170000 A1* | 6/2015 | Yang ............. G06V 10/764 382/224 |
| 2015/0285513 A1 | 10/2015 | Matarazzi et al. |
| 2015/0289324 A1 | 10/2015 | Rober et al. |
| 2016/0063734 A1 | 3/2016 | Divakaran et al. |
| 2016/0242240 A1 | 8/2016 | Lee et al. |
| 2016/0278563 A1 | 9/2016 | Choudhary |
| 2016/0283822 A1 | 9/2016 | Imai et al. |
| 2016/0302265 A1 | 10/2016 | Kreiner |
| 2017/0074522 A1 | 3/2017 | Cheng |
| 2017/0150842 A1 | 6/2017 | Young et al. |
| 2017/0224161 A1 | 8/2017 | Li et al. |
| 2017/0332841 A1 | 11/2017 | Reischmann |

(56) References Cited

U.S. PATENT DOCUMENTS

| | | |
|---|---|---|
| 2018/0324908 A1 | 11/2018 | Denker et al. |
| 2019/0110638 A1 | 4/2019 | Li et al. |
| 2019/0200797 A1 | 7/2019 | Diao et al. |
| 2019/0234617 A1 | 8/2019 | Bhogal et al. |
| 2019/0250043 A1 | 8/2019 | Wu et al. |
| 2019/0354810 A1 | 11/2019 | Samel et al. |
| 2020/0069103 A1 | 3/2020 | Baldwin et al. |
| 2020/0193620 A1 | 6/2020 | Armstrong et al. |
| 2020/0217512 A1 | 7/2020 | Clayton et al. |

FOREIGN PATENT DOCUMENTS

| | | |
|---|---|---|
| CN | 201353794 Y | 12/2009 |
| CN | 202392848 U | 8/2012 |
| CN | 103234228 A | 8/2013 |
| CN | 103501618 A | 1/2014 |
| CN | 103592227 A | 2/2014 |
| CN | 104042124 A | 9/2014 |
| CN | 203914599 U | 11/2014 |
| DE | 19828333 A1 | 12/1999 |
| DE | 102005030483 A1 | 1/2007 |
| DE | 202008009135 | 3/2008 |
| DE | 102008043722 A1 | 5/2010 |
| DE | 102012204229 A1 | 9/2013 |
| EP | 0298858 A1 | 1/1989 |
| EP | 0899512 A1 | 3/1999 |
| EP | 1179711 A1 | 2/2002 |
| EP | 1746350 A2 | 1/2007 |
| EP | 2149755 A1 | 2/2010 |
| EP | 2515044 A1 | 10/2012 |
| EP | 2618634 A1 | 7/2013 |
| GB | 1163509 A | 9/1969 |
| GB | 1195750 A | 6/1970 |
| JP | 11-63509 | 3/1999 |
| JP | 2004187778 A | 7/2004 |
| JP | 2005276171 A | 10/2005 |
| JP | 201353794 | 3/2013 |
| WO | 2006128696 A1 | 12/2006 |
| WO | 2007022507 A2 | 2/2007 |
| WO | 2009012874 A2 | 1/2009 |
| WO | 2013167333 A1 | 11/2013 |
| WO | 2014086486 A2 | 6/2014 |
| WO | 2014086487 A1 | 6/2014 |
| WO | 2015059931 A1 | 4/2015 |
| WO | 2019232113 A1 | 12/2019 |

OTHER PUBLICATIONS

International Search Report and Written Opinion for Application No. PCT/2021/022352 dated Jul. 1, 2021.

Khan, Tareq, "An Intelligent Microwave Oven with Thermal Imaging and Temperature Recommendation Using Deep Learning", Applied System Innovation, 2020, 3, 13, Feb. 17, 2020, www.mdpi.com/journal/asi.

Karimi, Davood "Deep learning with noisy labels: exploring techniques and remedies in medical image analysis" arXiv:1912.02911v4 [cs.CV] Mar. 20, 2020.

U.S. Appl. No. 12/216,999, filed Jul. 14, 2008, Kim, et al.
U.S. Appl. No. 13/059,486, filed Aug. 26, 2009, Sakane, et al.
U.S. Appl. No. 13/978,413, filed Apr. 19, 2012, Ruther.
U.S. Appl. No. 14/205,587, filed Mar. 12, 2014, Chadwick, et al.
U.S. Appl. No. 14/205,593, filed Mar. 12, 2014, Chadwick, et al.
U.S. Appl. No. 15/510,544, filed Oct. 9, 2015, Kondo, et al.

"Electrolux launches CombiSteam Pro Smart", http://www.homeappliancesworld.com/2018/03/08/electrolux-launches-combisteam-pro-smart/, downloaded from internet on Jan. 18, 2019, 2 pages.

Automated Fruit Recognition for Super Markets and Food Stores, Fraunhofer, http://www.iosb.fraunhofer.de/servlet/is/33328/, accessed online Nov. 13, 2014.

Fang, Chi et al. "Cooking Time Optimization on Given Machine Constraints and Order Constraints" Integer Programming Approach, Dec. 17, 2016.

Sun, Da-Wen; "Computer Vision Technology for Food Quality Evaluation", Second Edition, Academic Press, 2016.

International Search Report and Written Opinion for Application No. PCT/2021/024648 dated Jun. 23, 2021.

Chen, Pengfei, et al., "Understanding and Utilizing Deep Neural Networks Trained with Noisy Labels", Proceeding of the 36th International Conference on Machine Learning, Long Beach, California, PMLR 97, 2019.

Reitermanova, Z., et al., "Data Splitting", WDS '10 Proceedings of Contributed Papers, Part I, 31-36, 2010.

\* cited by examiner

SYSTEM AND METHOD FOR CLASSIFICATION OF AMBIGUOUS OBJECTS

CROSS-REFERENCE TO RELATED APPLICATIONS

This application claims the benefit of U.S. Provisional Application Ser. No. 63/001,200 filed 27 Mar. 2020 and U.S. Provisional Application Ser. No. 63/025,139, filed on 14 May 2020, each of which is incorporated in its entirety by this reference. This application is related to U.S. application Ser. No. 16/008,478 filed 14 Jun. 2018, each of which is incorporated in its entirety by this reference.

TECHNICAL FIELD

This invention relates generally to the computer vision field, and more specifically to a new and useful system and method for classifying ambiguous objects in the computer vision field.

BACKGROUND

Automated appliances, such as smart ovens, can rely on computer-vision-based techniques to automatically recognize objects within a cavity (e.g., foodstuff to be cooked, quantities of foodstuff to be cooked, and/or accessories occluded by foodstuff). However, when objects belonging to a particular class are visually ambiguous (e.g., visually similar to objects belonging to other classes), the accuracy of computer-vision based techniques can be reduced. Accuracy reduction can be a result of reduced initial labelling efficacy, reduced labelling consistency, manual errors (e.g., due to inexperienced labelers), or other errors. Reduced labelling accuracy can adversely impact the classification accuracy of a model trained on the inaccurately-labeled data, especially when the training dataset is small.

Thus, there is a need in the computer vision field to create a new and useful system and method for classification of ambiguous objects. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
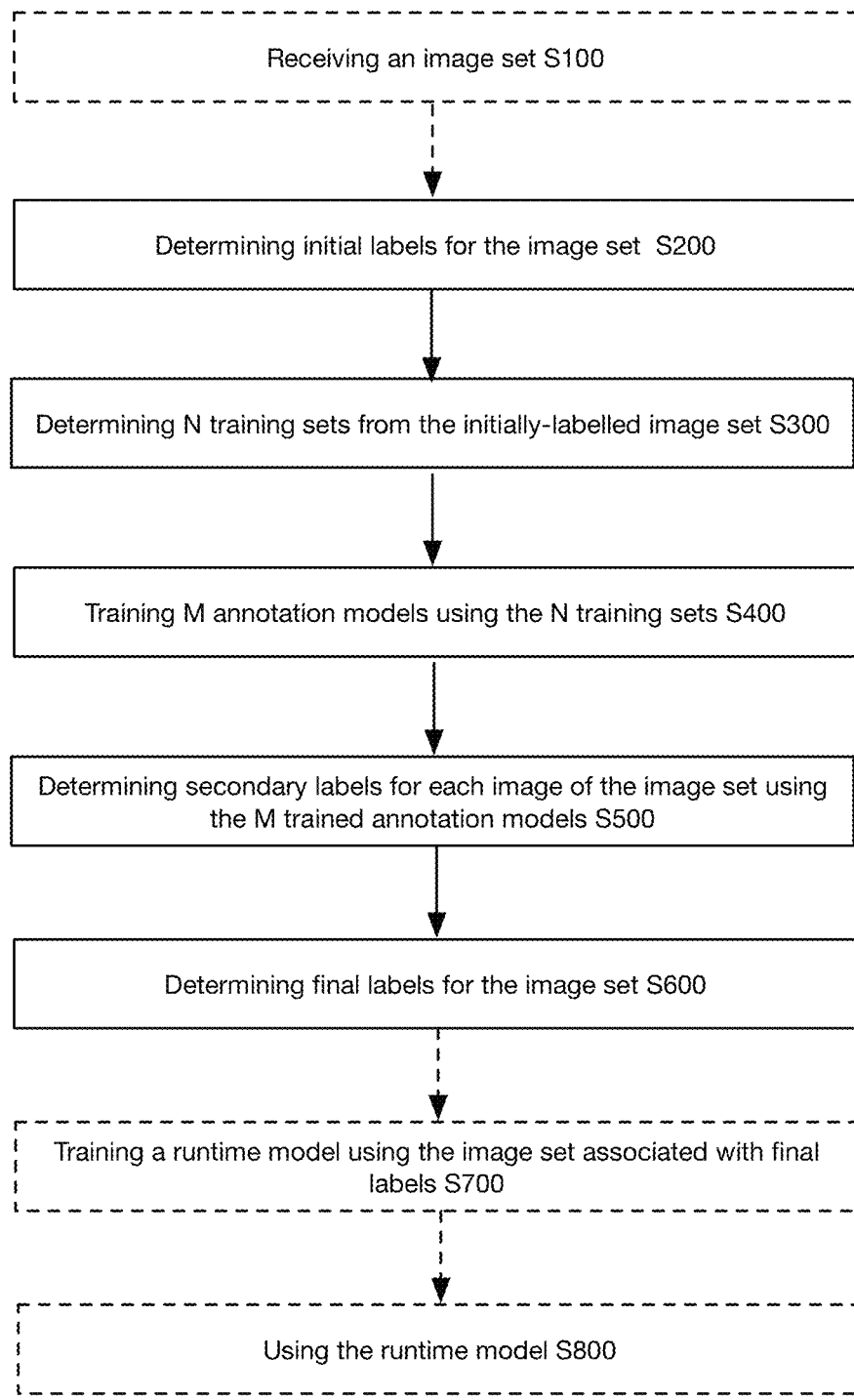
FIG. 1 is a schematic representation of the method.
Figure 3:
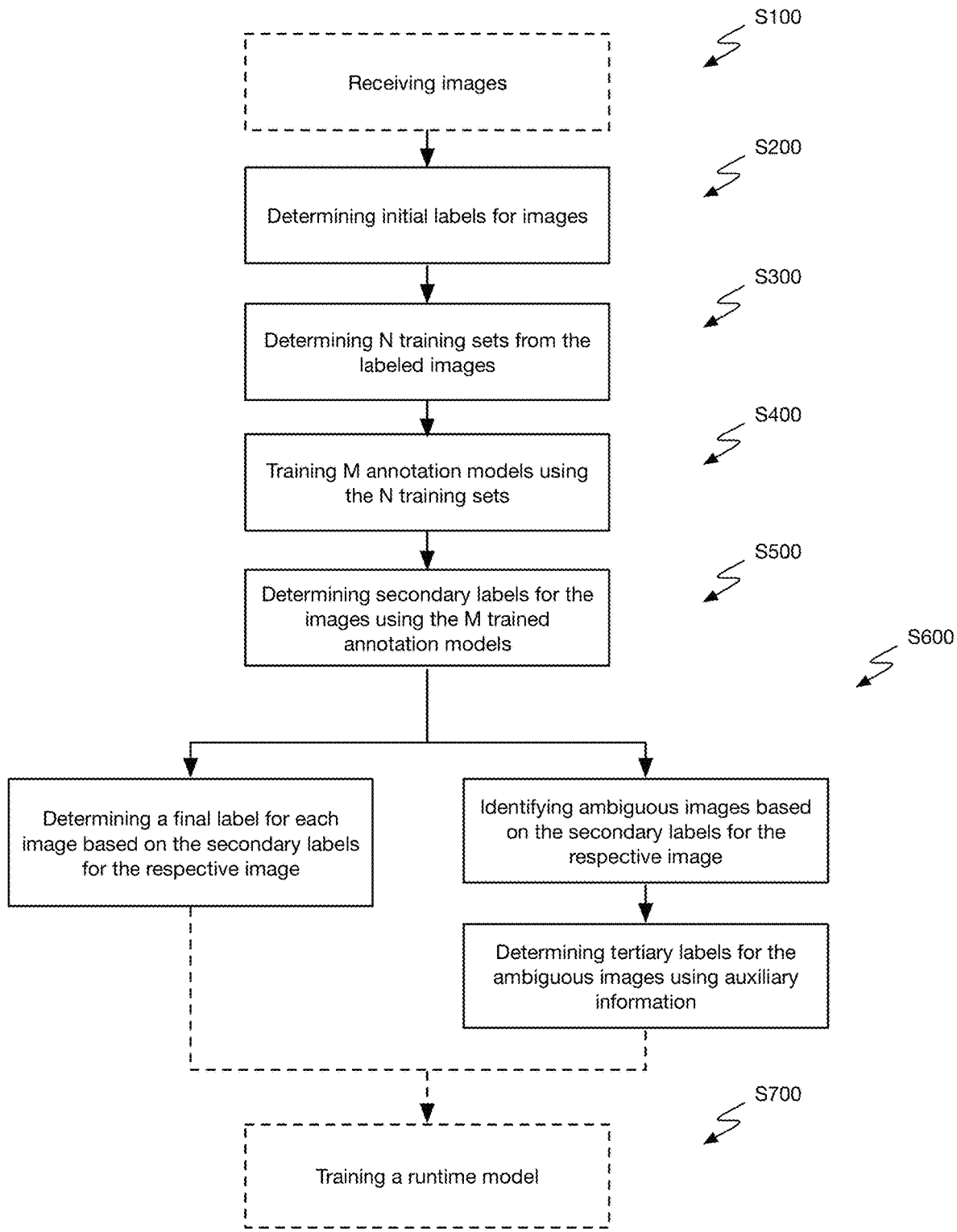
FIG. 3 is an embodiment of the method.

As shown in FIG. 1, the method for classification of ambiguous objects includes optionally receiving an image set S100; determining initial labels for the image set S200; determining N training sets from the initially-labelled image set S300; training M annotation models using the N training sets S400; determining secondary labels of each image of the image set using the M trained annotation models S500; determining final labels for the image set S600; optionally training a runtime model using the image set associated with final labels S700; and optionally using the runtime model S800; but the method can additionally or alternatively include or any other suitable elements. An embodiment of the method is depicted in FIG. 3.

Figure 2:
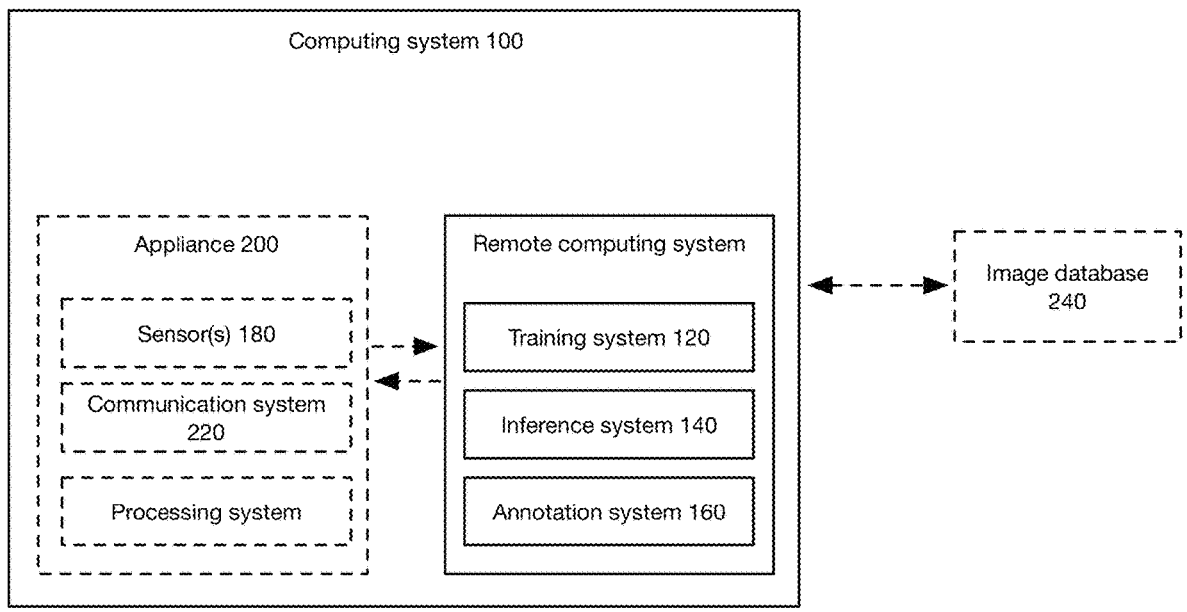
FIG. 2 is a schematic representation of the system.

As shown in FIG. 2, the system for classification of ambiguous objects can include one or more computing systems 100, one or more communication systems 120, one or more annotation systems 140, and one or more training systems 160, and/or any other suitable components.

2. Examples

In a first example, the method can include: receiving images from a plurality of appliances; determining an image set related to a particular classification task of an ambiguous object (e.g., determining different types of pizza, determining different types of chicken, determining different types of beef or other meat, determining different types of bread, determining different types of vegetables, etc.); receiving an initial annotation for each image of the image set from a manual labeler to generate W labeled images; determining N training sets from the set of W initially-annotated images, wherein the N training sets can include K orders, wherein each order includes all (or a subset thereof) of the W labeled images; training M models using the N training sets using classes that correspond to the initial annotations for the respective images; determining secondary labels for each image using the M trained annotation models; if a threshold number of the secondary labels agree for an image, assigning the respective secondary label to the image as the image's final label; if less than a threshold number of the secondary labels agree for an image, and facilitating reannotation of the image based on auxiliary data to determine the image's final label (e.g., a set of likely labels, determined using confidence scores determined by the M annotation models for each secondary annotation). The method can optionally include training a runtime model using the image set and associated final labels; and inferring a class of an unseen image using the trained runtime model. The number of annotation models M can be the same as or different from the number of training sets N.

3. Benefits

The method confers several benefits over conventional training data generation methods.

First, the method can train a classification model that has higher classification accuracy (and/or precision) than the initial label accuracy and/or precision (e.g., by identifying ambiguous images and facilitating ambiguous image relabeling with hints or auxiliary data). This can enable low-cost, low-accuracy labelling techniques to be used (e.g., manual labelers, crowdsourced labeling, etc.) while still achieving high model classification accuracy (e.g., 0.7, 0.8, 0.85, 0.9, 0.95, 0.99, etc.). This can also reduce the label noise introduced by non-specialist manual labelers and/or inherent ambiguity in the images.

Second, the method can train a model to achieve high accuracy using a small training data set (e.g., 1,000 images, 10,000 images, 20,000 images, etc.) without overfitting to the training data, which is enabled by the training data generation method. Conventional solutions use millions of images (which can be rampant with labeling errors) to achieve equivalent accuracy.

Third, the method can generate training data labels using a semi-automated technique that re-labels images automatically based on manually determined initial labels as opposed to relying on exclusively manual labelling. However, the method and system can confer any other suitable benefits.

4. System

As shown in FIG. 2, the system for classification of ambiguous objects can include: one or more computing systems 100, one or more training systems 120, one or more inference systems 140, and/or one or more annotation systems 160. The system can also include, or be used with: one or more sensors 180, one or more appliances 200, one or more communication systems 220, one or more image databases 240, and/or any other suitable components. The system preferably functions to perform the method, but can additionally or alternatively perform any other suitable functionalities.

The one or more computing systems 100 can function to perform all or part of the method and/or any other suitable process. The computing system can include: a remote computing system, one or more appliances 200 (e.g., processing systems thereof), user devices, and/or other hardware components. The computing system can include and/or execute: a training system 120, an inference system 140, optionally an annotation system 16o, and/or any other suitable software components. The computing system can be integrated with the processing system and/or be separate. However, the computing system can be otherwise configured.

The one or more training systems 120 can function to train the one or more annotation models and/or the runtime model. The training system can be run on the processing system of an appliance, the computing system, and/or any other suitable system. The models can be trained using: supervised learning, unsupervised, learning, semi-supervised learning, reinforcement learning, and/or any other suitable learning technique. The annotation models and/or runtime model can include neural networks (e.g., DNN, CNN, RNN, transformer, fully connected, etc.), a cascade of neural networks, decision trees, logistic regressions, SVMs, one or more heuristics, and/or any other suitable algorithms. The training system can include optimization algorithms (e.g., gradient descent, Newton method, etc.), and/or other models. However, the training system can include any other suitable components.

The one or more inference systems 140 can function to determine object classifications for images using the one or more annotation models (e.g., trained annotation models, trained models, etc.) and/or the runtime model. The inference system can be run on the processing system of the appliance, on the computing system, and/or any other suitable system. However, the inference system can include any other suitable components.

The one or more annotation systems 160 can function to receive (e.g., from manual labelers, from a third-party service, etc.), and/or determine one or more annotations for images. The annotation system can include one or more user interfaces (e.g., one or more labelling interfaces), one or more unsupervised learning algorithms for automatic labelling, and/or any other suitable elements. The annotation system can label images using a predefined set of label options (e.g., retrieved from a database, received from the computing system, etc.) or determining a label based on each image (e.g., freeform). The images and optionally the associated labels can be stored in the image database for use by the method, the training system, and/or be otherwise used. However, the annotation system can include any other suitable components.

The one or more sensors 180 can function to determine sensor measurements (e.g., used in S100, etc.). The sensor measurements can include: cavity measurements, event measurements, and/or other measurements. The sensors are preferably integrated into the appliance, but can additionally or alternatively be separate. The sensors can include one or more optical sensors (e.g., image sensors, light sensors, fiber optic sensors, photoelectric sensors, etc.), audio sensors, temperature sensors, door sensors (e.g., a switch coupled to the door, etc.), power sensors (e.g., Hall effect sensors), inertial sensors (e.g., accelerators, gyroscope, magnetometer, etc.), 3D scanners, occupancy sensors (e.g., PIR sensor, ultrasonic sensor, microwave sensor, time of flight sensor, etc.), and/or any other suitable sensors. The sensors can be directly or indirectly coupled to the cavity. The sensors can be connected to and controlled by the processor of the appliance, a user device, or be otherwise controlled. The sensors are preferably individually indexed and individually controlled, but can alternatively be controlled together with other sensors.

The sensors and/or any associated processing systems (e.g., chipsets) can be arranged along the top of the cavity (e.g., distal the heating elements, distal the feet, etc.), arranged along the side of the cavity, arranged along the bottom of the cavity, arranged in a corner of the cavity (e.g., upper right, upper left, upper back, etc.), arranged in the door of the cavity (e.g., supported by the inner door wall, supported by the outer door wall, be integrated into the user interaction unit, etc.), and/or be supported by any other suitable portion of the appliance. Alternatively, the associated processing systems can be arranged separate from the respective sensors (e.g., be part of the processing system, be part of a remote computing system, etc.).

In one variation, the sensors can include an optical sensor that functions to measure optical data about the cavity (e.g., foodstuff within the cooking cavity). In a first embodiment, the sensor includes a camera configured to record images or video of the cavity (e.g., food cooking within the cavity). The camera can be a CCD camera, stereo camera, hyperspectral camera, multispectral camera, IR camera, visual range camera, video camera, wide angle camera (e.g., a fisheye camera with a fisheye lens, a rectilinear camera with a rectilinear lens, etc.), or any other suitable type of camera. In a specific example, the wide-angle camera can have an approximately 180-degree field of view (e.g., within 10 degrees or less). The camera is preferably thermally connected to the cavity (e.g., is subjected to cooking temperatures), but can alternatively be thermally insulated from the cavity and/or otherwise thermally connected to the cavity. The camera can be arranged next to (e.g., on the same wall as, within a threshold distance of, etc.) a heating element, or be arranged distal the heating elements. The camera can be cooled by convection elements, cooled by a separate cooling system (e.g., a radiator and fan, watercooling, etc.), or remain uncooled. The camera can record images using radiation emitted or reflected by the heating elements, by the foodstuff, by the oven walls, by an emitter, or by any other suitable radiation source. Alternatively or additionally, the camera can record images using ambient light.

The camera can be mounted to the cavity wall, but can alternatively be mounted to the door (e.g., door interior, door exterior), and/or another portion of the appliance. The camera is preferably mounted to an interior cavity wall, but can alternatively be mounted to an exterior cavity wall (e.g., wherein the cavity is dual-walled), mounted to a cavity threshold (e.g., to the door frame), and/or mounted to another portion of the cavity. The camera lens is preferably flush with the cavity wall, but can alternatively be recessed or protrude from the cavity wall. The camera can be centered along the respective appliance surface, offset from the appliance surface center, or be arranged in any other suitable position. The camera can be statically mounted to the appliance surface, movably mounted to the appliance surface (e.g., rotate about a rotational axis, slide along a sliding axis, etc.), or be otherwise coupled to the appliance. The appliance can include one or more cameras. The cameras can be substantially identical or be different. The cameras can be evenly distributed throughout the cavity (e.g., symmetrically distributed), or be unevenly distributed.

The camera can have a constant frame rate (sampling rate), variable frame rate, or any other suitable frame rate. For example, the frame rate can be dynamically adjusted to accommodate for the processing speed of the classification module. The camera can have a static field of view, variable field of view, or other suitable field of view. The camera is preferably arranged with its field of view (FOV) directed at the cavity, but can alternatively be otherwise arranged. The FOV (single or combined) preferably substantially encompasses the entirety of the cavity, but can alternatively encompass a subset of the cavity or encompass any other suitable portion of the cavity. The FOV preferably encompasses at least the food tray or bottom of the cavity, but can additionally or alternatively encompass the front, back, walls, top, or any other suitable portion of the cavity. The camera is preferably sensitive to (e.g., measure in the spectral wavelength of) visual light, but can alternatively or additionally be sensitive to infrared light, ultraviolet light, or any other suitable electromagnetic wavelength.

Figure 8:
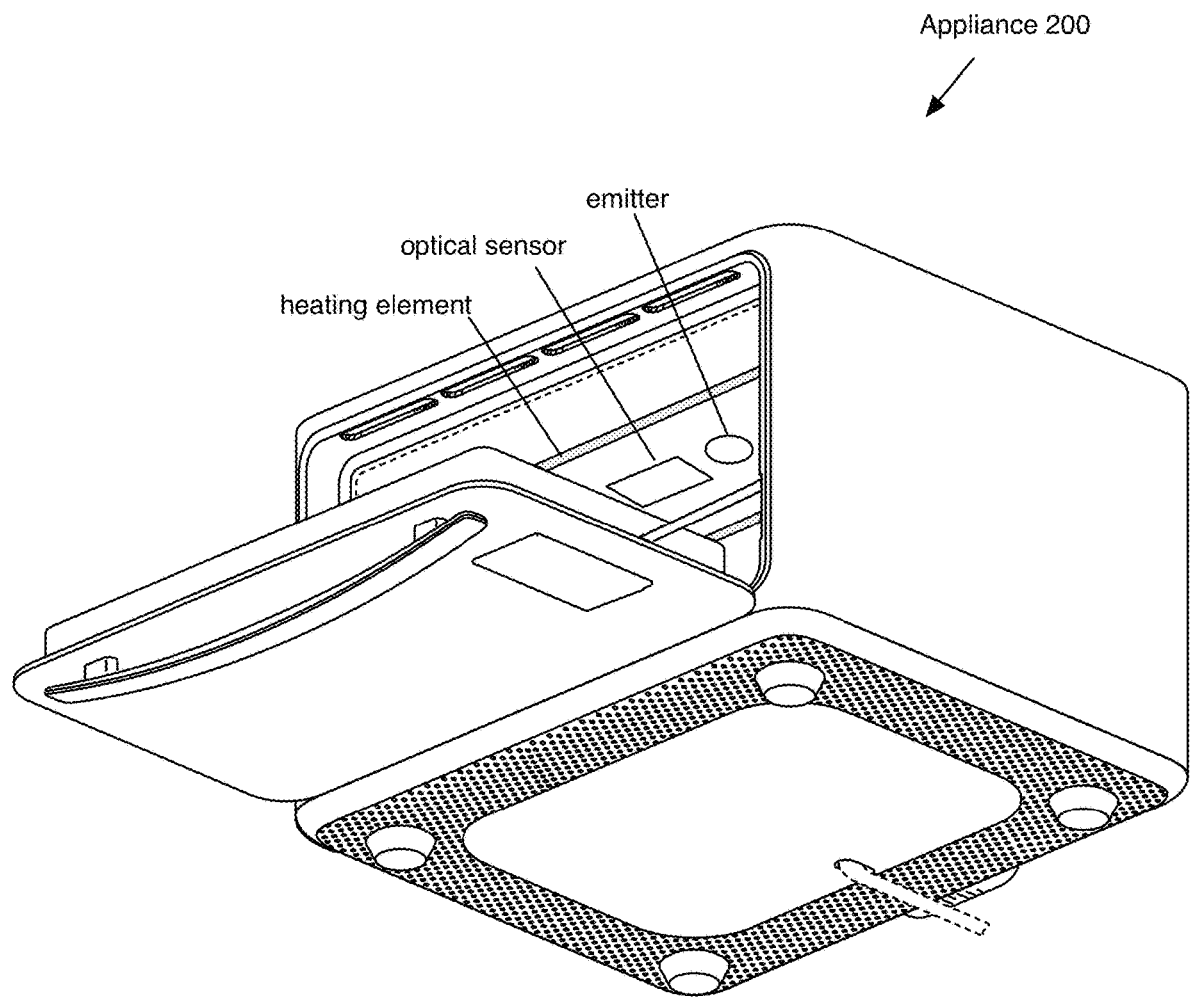

As shown in FIG. 8, in a first variation, the appliance includes a single camera mounted to the top of the cavity and directed with the FOV toward the cavity bottom. In a second variation, the appliance includes a single camera of limited view (e.g., wherein the FOV is less than a majority of the cavity), wherein the camera is directed toward a food pan (e.g., tray) proximal the heating elements.

In a third variation, the appliance includes a first and second camera having different FOVs (e.g., arranged along different sides of the appliance and directed in opposing directions) directed at the food pan. In this variation, a virtual 3D model can be constructed from the images recorded by the first and second cameras. However, the appliance can include any other suitable camera.

However, the one or more sensors can additionally or alternatively include any other suitable components.

Figure 7:
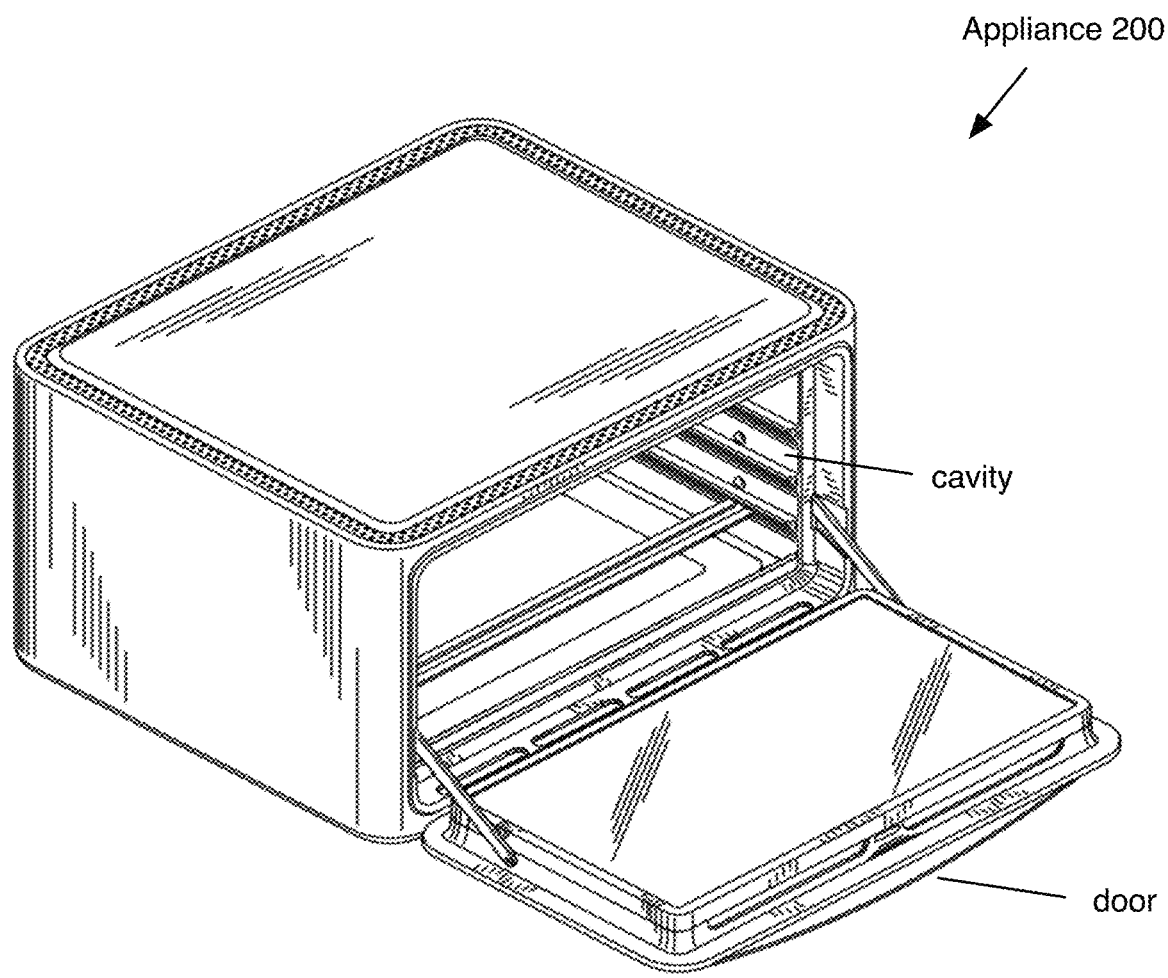
FIGS. 7-8 are schematic representations of variations of the appliance.

The appliance 200 can function to capture sensor measurements for use by the method. The appliance can include memory (e.g., non-volatile, volatile, etc.) for storing one or more class labels for the images; a processing system for sampling and recording sensor measurements; a communication system (e.g., WiFi system, cellular system, Bluetooth system) for receiving and/or transmitting information (e.g., to and/or from the remote computing system and/or a user device); and/or any other suitable elements. Examples of appliances include: ovens (e.g., kitchen oven, industrial oven, microwave oven, etc.), cooktops, grills, smokers, and/or any other suitable appliance. Variants of the appliance are depicted in FIGS. 7-8. A specific example of an appliance that can be used is described in U.S. application Ser. No. 16/793,309 filed 18 Feb. 2020, which is incorporated herein in its entirety by this reference. However, other appliances can be used.

The processing system can sample and record sensor measurements, control appliance operation based on the classification results from the runtime model (e.g., select the cook program based on the food class, etc.), and/or perform any other process. The processing system can include one or more processors (e.g., microprocessors, CPU, GPU, etc.), memory (e.g., volatile, nonvolatile, etc.), and/or any other suitable hardware. The processing system is preferably separate from the training system, inference system, and the annotation system, but can alternatively include the training system, inference system, and the annotation system. The processing system can be part of the computing system, include the computing system, or be separate. The processing system can be: local to the appliance (e.g., local computing system), remote from the appliance (e.g., a remote computing system), include both a local and remote component, be distributed (e.g., across multiple appliances), and/or be otherwise configured.

The appliance can define a cavity that receives food, accessories (e.g., plate, pan, baskets, racks, baking sheet, pot, etc.), racks, and/or other items. The cavity can include heating elements, cooling elements, convection elements, and/or other cooking elements. The cavity can be made accessible through a door (e.g., side door, top door, etc.), or otherwise accessed. The cavity can be associated with cavity measurements that monitor parameters of the cavity. The cavity measurements are preferably used by the method for ambiguous object classification (e.g., during runtime), but can additionally or alternatively be used for determining a cook program, for determining a maintenance issue, and/or for any other suitable process. The cavity measurements can include images (e.g., still images, videos, etc.), audio, vibration, weight changes (e.g., in the overall appliance, in a rack weight), light sensors, temperature, proximity or occupancy measurements, and/or any other suitable measurement. Cavity parameters that can be monitored include: cavity occupancy (e.g., empty/occupied), temperature, light, food parameters (e.g., food class, food volume, food numerosity, food placement, etc.), cavity noise, and/or any other suitable cavity parameter.

The appliance can include one or more emitters that function to emit signals that an optical sensor (e.g., image sensors, fiber optic sensors, photoelectric sensors, etc.) can measure. For example, the emitter can be a light emitter, wherein a camera records optical or visual images using light or other electromagnetic radiation emitted by the light emitter. The light can be: visible light, infrared, UV, and/or have another wavelength. In a second example, the emitter can be an acoustic emitter, wherein the acoustic sensor records acoustic images using acoustic waves emitted by the acoustic emitter. The acoustic waves can be: ultrasound, radar, and/or have another wavelength. However, the emitter can emit any other suitable signal.

However, the appliance can additionally or alternatively include any other suitable components that perform any other suitable functionalities.

The one or more communication systems 220 (e.g., wireless communication system), which can include APIs (e.g., API requests, responses, API keys, etc.), requests and/or other suitable communication channels. The communication system can include long-range communication systems (e.g., supporting long-range wireless protocols), short-range communication systems (e.g., supporting short-range wireless protocols), and/or any other suitable communication systems. The communication systems can include cellular radios (e.g., broadband cellular network radios), such as radios operable to communicate using 3G, 4G, and/or 5G technology, WiFi radios, Bluetooth (e.g., BTLE) radios, wired communication systems (e.g., wired interfaces such as USB interfaces), and/or any other suitable communication systems.

The image database 240 can function to store the images and optionally associated labels. The image database is preferably located at the remote computing system, but can additionally or alternatively be located at the appliance, or at any other suitable location. However, the image database can include any other suitable elements.

5. Method

As shown in FIG. 1, the method for classification of ambiguous objects includes: optionally receiving an image set S100; determining initial labels for the image set S200; determining N training sets from the initially-labelled image set S300; training M annotation models using the N training sets S400; determining secondary labels for each image of the image set using the M trained annotation models S500; determining final labels for the image set S600; optionally training a runtime model using image set associated with final labels S700; and optionally using the runtime model S800. However, the method can additionally or alternatively include any other suitable elements. The method is preferably performed by the system discussed above, but can alternatively be performed by any other suitable system. The method can be performed when a new ambiguous object group (e.g., multiple different classes) is determined, when the accuracy of classifications for an existing ambiguous object group falls below a threshold accuracy (e.g., below 0.98, below 0.95, below 0.9, below 0.85, below 0.8, etc.), when requested by a user, and/or at any other suitable time.

Figure 4:
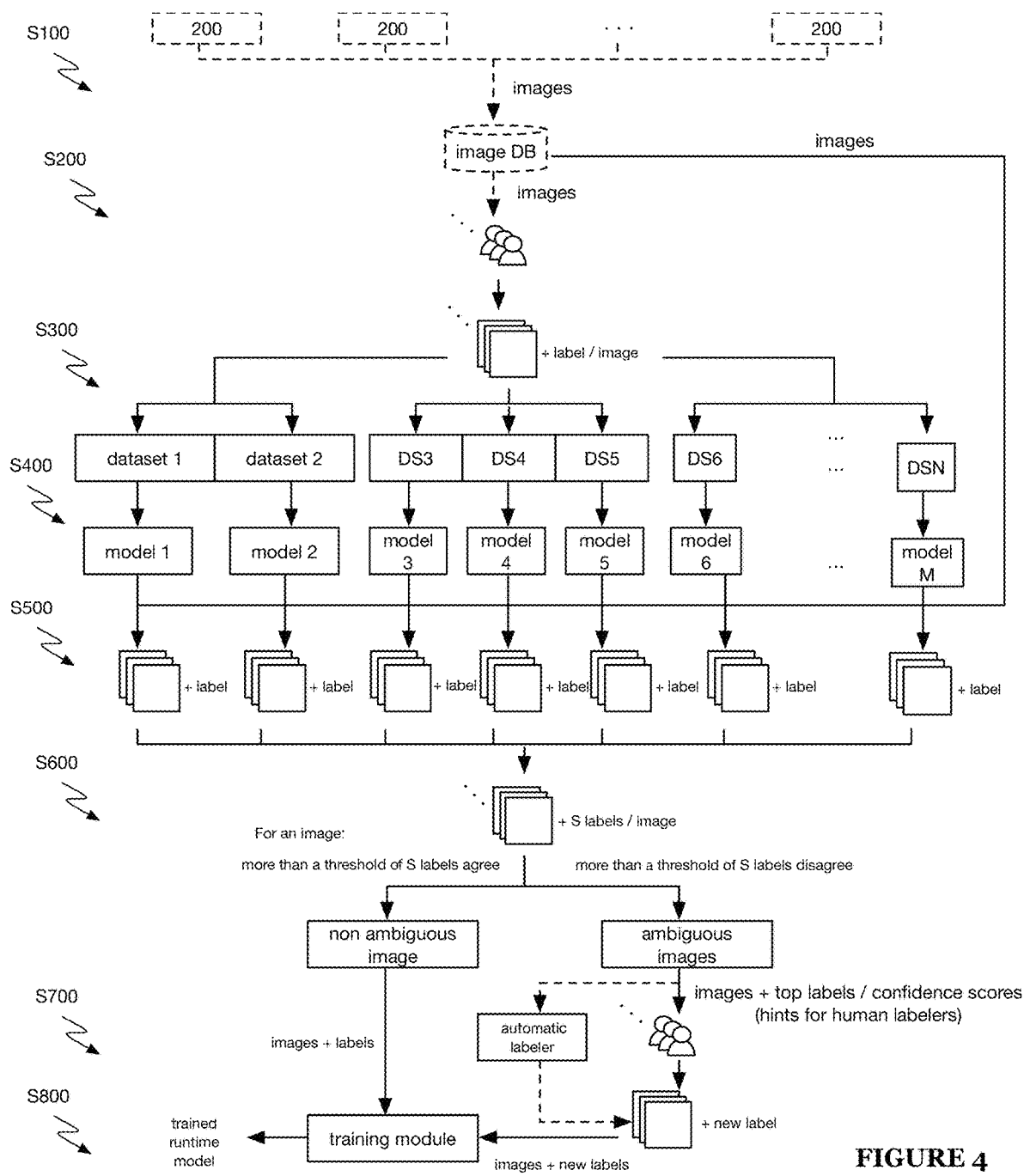
FIG. 4 is an illustrative representation of the method.

The method optionally includes receiving an image set S100, which can function to receive training data for S200. The image set can include W images (training images), where W can be 1, 10, 100, 1000, 10,000, 100,00, and/or any other suitable number of images. The images can be sampled by one or more appliances (e.g., shown in FIG. 4 and FIGS. 7-8), and/or simulated, or otherwise determined. The images can be received directly from an appliance, retrieved from the image database, or otherwise received. The images can be sampled from a top-down view, isometric view, or any other suitable view of a scene.

The images preferably depict ambiguous objects located in a region of interest. The region of interest is preferably the interior of an appliance cavity, but can be located on the exterior of an appliance cavity (e.g., counter, table, etc.), and/or be any other suitable imaged region. Ambiguous objects can belong to one or more ambiguous object groups. Different object groups can represent different types of foodstuff (e.g., a dish, an ingredient, etc.), different types of accessories, different quantities of foodstuff (e.g., such as fraction representing portion size, count of objects, etc.), and/or other object groups. Each object group can include multiple ambiguous object classes, wherein each ambiguous object class can be treated differently (e.g., trigger a cook program specific to the ambiguous object class).

In a first embodiment, an object group can represent a dish or an ingredient. In a first example, the object group can be pizza, wherein the ambiguous object classes of the object group can include: classic crust, thin crust, rising crust, personal pizza, thick crust, stuffed crust, flatbread crust, deep dish, frozen, defrosted, and/or other pizza types. In a second example, the object group can be chicken, wherein the ambiguous object classes of the object group can include: whole chicken, thigh, breast, drumsticks, leg quarters, wings, frozen, defrosted, and/or other types of chicken or poultry. In a third example, the object group can be beef, wherein the ambiguous object classes of the object group can include: chuck, brisket, shank, plate, rib, flank, loin, round, frozen, defrosted, and/or other types of beef. In a fourth example, the object group can be fries, wherein the ambiguous object classes of the object group can include: classic french fries, crinkle cut, steak fires, shoestring fries, sweet potato fries, frozen, defrosted, and/or other types of fries.

In a second example, an object group can be a particular accessory (e.g., pan, roasting rack, air fry basket, types of plates, types of baking sheets, types of pots, etc.), which can be occluded by foodstuff (thereby making labeling more challenging and impacting the classification accuracy of the model). For example, an object group can be a sheet pan, wherein the ambiguous object classes can be: uncovered sheet pan, foil-lined sheet pan, parchment-lined sheet pan, silicone-lined sheet pan, nonstick sheet pan, aluminum sheet pan, and/or other sheet pan types or configurations. An object group can alternatively be all accessories (e.g., for classification of the ambiguous accessory).

In a third example, an object group can be portion sizes (e.g., wherein the ambiguous object classes of the object group can include: ½ full, ¼ full, entirely full, overloaded, etc.), counts of ambiguous objects (e.g., wherein the ambiguous object classes of the object group can include the object count), and/or any other suitable type of quantity.

However, an object group can be otherwise defined.

Each image can be associated with other images (e.g., from the same or different perspective of the same object or region of interest), auxiliary data (e.g., audio, video, temperature, weight, rack height, etc.), and/or associated with any other suitable information. However, receiving the image set can additionally or alternatively include any other suitable elements.

Determining initial labels for the image set S200 can function to determine an initial label estimate for each image of the image set and/or for any image stored in the image database. The initial label can represent an ambiguous object class, wherein the ambiguous object class is part of an ambiguous object group. For example, a class can be deep dish pizza, wherein the ambiguous object group is pizza types. The initial label can be determined by manual labelers (e.g., crowdsourced labelers such as using mechanical turk, Revolt, etc.), automatic labelers such as the unsupervised learning algorithms of the annotation system, pretrained models (e.g., trained for another task, trained for the same task, etc.), and/or any other suitable labeler. The initial label can be noisy (e.g., inaccurate; wherein the true label is unknown) or not noisy (e.g., be an accurate label, wherein the true label is known, wherein the label is generated by a specialist, wherein the label is verified against another source of truth, etc.). One or more initial labels can be determined per image of the image set. When multiple initial labels are determined for an image, each initial label can be treated as an initial vote for a particular initial label.

In a first variation, the method retrieves predetermined labels for each image. In a second variation, the method facilitates initial label determination for unlabeled images. For example, the image can be sent to one or more manual labelers (e.g., with or without hints or other information), wherein the manual labelers can assign a label to the image (e.g., from a predetermined set of label options, a freeform entry, etc.). In a second example, the image can be automatically labelled by an initial annotation model (e.g., model trained for the same task, a different but related task, a different task in the same domain, a different domain, etc.). However, the label can be determined using a combination of the above, or otherwise determined.

Determining initial labels can optionally include selecting an initial label from the initial votes. In a first variant, the initial label can be selected using majority vote. In a second variant, the initial label can be selected based on a probability distribution between a set of the most likely initial votes (e.g., wherein the set can contain more than 2 votes, more than 3 votes, more than 4 votes, more than 10 votes, more than 20 votes, etc.). However, determining initial labels can additionally or alternatively include any other suitable elements.

Determining N training sets from the initially-labelled image set S300 can function to generate multiple independent training sets (e.g., partitions of the image set) that can be used to reduce labelling errors of the initial labels determined in S200. The number of training sets, N (e.g., 10, 20, 25, 30, 35, 40, etc.), can be determined empirically, heuristically, randomly, based on M models (e.g., equal to M, less than M, more than M, etc.), and/or otherwise determined.

Each training set can include a number of images that can be predetermined, determined randomly, based on the number of images, based on the number of training sets, and/or otherwise determined. Images of the image set can be assigned to a training set: randomly, sequentially, according to a predetermined association (e.g., wherein each image is assigned an index, wherein the indices are preassigned to different training sets), using a low discrepancy sequence, using statistical sampling, based on the initial labels, and/or otherwise assigned.

In a first example, the N training sets are generated by selecting a predetermined number of images randomly from the set of initially-labelled images and removing those selected images before generating the next training set, but can additionally or alternatively be generated sequentially (e.g., first $X_1$ images are assigned to a first training set, next $X_2$ images assigned to the second training set, and so on).

The training sets can be non-overlapping (e.g., not share images) or overlapping (e.g., share images). The training sets can have the same number of images per training set, or have or different numbers of images. The training sets can have the same or different distribution of initial labels. The sampling method (e.g., used to include and/or exclude images to and/or from the training set) can be the same or different across different training sets. Different training sets preferably include different images, but can alternatively have the same images. However, the training sets can be otherwise related.

Determining N training sets can optionally include determining N training sets split into K orders. The number of orders, K, can be predetermined (e.g., empirically, heuristically, randomly, etc.), iteratively determined, determined based on the image set size, and/or otherwise determined.

Each order preferably includes all images of the initially-labelled image set (e.g., multiple different copies of the same image can be included in one or more training sets), but can additionally or alternatively include a subset thereof. Different orders preferably share the same set of images, but can alternatively have partially or completely different images. Different orders preferably have the same number of images, but can alternatively have different numbers of images.

Each order preferably includes one or more training sets. Each order preferably has a different number of training sets from other orders (e.g., a first order includes a first number of training sets and a different order includes a second number training sets different from the first, etc.), but can alternatively have the same number of training sets as one or more other orders (e.g., a first order includes a first number of training sets and a different order also includes the same number of training sets, etc.). When different orders include the same number of training sets, the training sets preferably have different image compositions, but can alternatively include the same images.

The training sets within an order can be the same size (e.g., have the same number of images) and/or different sizes. The training sets within an order is preferably non overlapping (e.g., disjoint), but can additionally or alternatively overlap with other training sets within the order (e.g., intersect). The images within the training sets of a particular order preferably cooperatively include all of the initially-labelled image set, but can alternatively include only a portion of the initially-labelled image set.

Training sets from different orders can have the same or different size (e.g., number of images), characteristics (e.g., label distribution, accuracy distribution, etc.), image composition (e.g., images), and/or other attributes. Training sets of different orders can be related (e.g., a first training set of a first order can be split into two different training sets of a second order, etc.) or unrelated (e.g., when images are randomly sampled, when images are shuffled between sequential assignment to training sets of different orders, etc.).

The images selected for a training set of a particular order can be randomly sampled from the image set, selected based on a sequential ordering of the image set, and/or otherwise selected from the image set. When an image is selected from the image set for inclusion in the training set, the selected image is preferably removed from the image set before sampling a subsequent image (e.g., sampling without replacement), but can alternatively be included in the image set for sampling a subsequent image (e.g., sampling with replacement) for inclusion in the training set, another training set in the same order, and/or a training set in a different order.

In a first variation, W labeled images can be split evenly into N training sets, wherein the N training sets are disjoint. In a second variation, W labeled images can be split unevenly into N training sets, wherein the N training sets are disjoint. In a third variation, W labeled images can be split into N training sets, wherein different subsets of the N training sets are disjoint with each other, but intersect with other training sets.

In a first example, determining N training sets can include defining K orders, wherein each order can include all of the images of the image set partitioned into one or more training sets, wherein the training sets of the K orders collectively define the N training sets. In this example, the training sets within each order are preferably non-overlapping (e.g., do not contain the same images of the image set; disjoint). Each order preferably includes a unique number of distinct training sets (e.g., 2, 3, 4, 5, 6, 7, 8, 9, etc.). For example, the first order can include two distinct training sets, the second order can include three distinct training sets, and so on, such that no order includes the same number of training sets, but alternatively different orders can include the same number of training sets.

Figure 5:
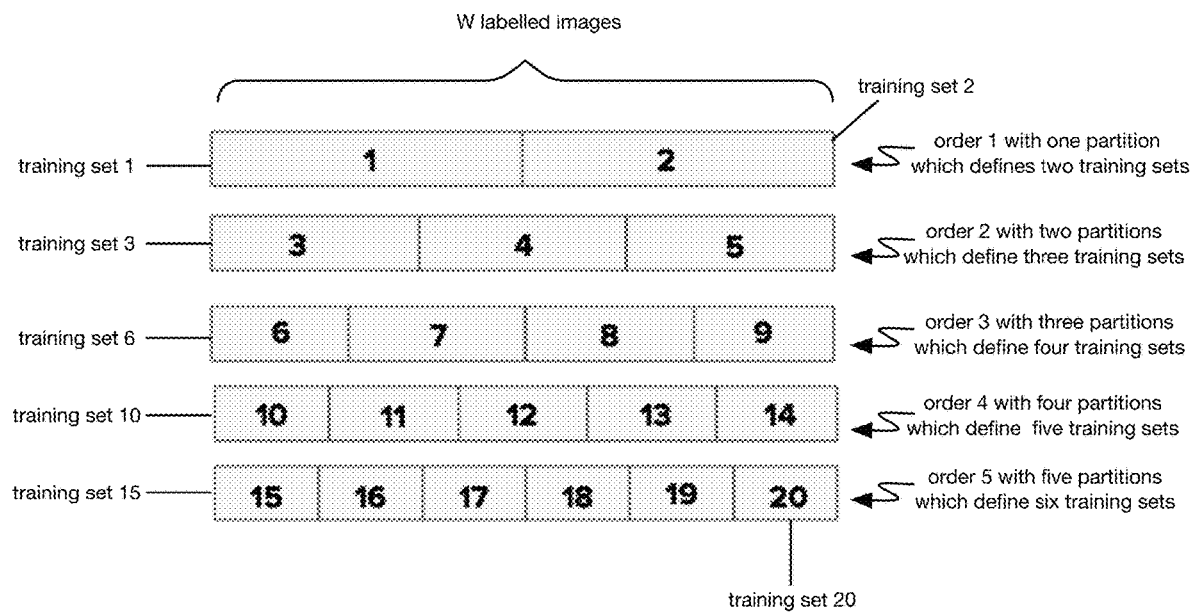
FIG. 5 is an illustrative representation of training data segmentation.

A specific example is depicted in FIG. 5, wherein K (e.g., 5) orders are defined, each including all (or a subset thereof)

of the same W labelled images randomly shuffled and partitioned to collectively define 20 training sets. The W images are partitioned into first and second training sets within the first order, the W images are partitioned into third, fourth, and fifth training sets within the second order, the W images are portioned into sixth, seventh, eighth, and ninth training sets within the third order, the W images are partitioned into tenth, eleventh, twelfth, thirteenth, and fourteenth trainings sets within the fourth order, and the W images are portioned into fifteenth, sixteenth, seventeenth, eighteenth, nineteenth, and twentieth training sets within the fifth order.

However, the N training sets can be otherwise determined.

The method preferably includes training M annotation models using the N training sets S400, which can function to train annotation models to recognize the ambiguous objects. The number of annotation models, M (e.g., 10, 20, 25, 30, 35, 40, etc.) can be equal to the number of training sets, N, but can additionally or alternatively be less than N or greater than N. The annotation models can have the same or different model architecture. The annotation models are preferably multi-class classifiers, more preferably a neural network (e.g., DNN, CNN, RNN, transformer, fully connected, etc.), but can additionally or alternatively be any of the models previously described. The annotation models are preferably untrained, but can alternatively be pretrained (e.g., for a related or completely unrelated task or domain). The weights learned for each annotation model are preferably different than the weights learned for the runtime model and/or other annotation models, but can alternatively be the same. The model architectures of the annotation models and the runtime model are preferably the same, but can additionally or alternatively be modified (e.g., adding one or more layers to a neural network) or can be a different model architecture.

Each of the M annotation models is preferably trained using a different training set, but can additionally or alternatively be trained using the same training sets. In variants, training M annotation models on different training sets (e.g., 20 training sets in the example of FIG. 5) ensures that every image in the image set is not used during training of one or more of the M models. Otherwise, if an image is part of the training set of every annotation model, that image is likely to retain its initial label as the secondary label during S500, even if the initial label is wrong. Each of the M annotation models is preferably trained on a model architecture that is smaller (e.g., fewer training parameters in the model architecture) than the final runtime model to prevent overfit, but can alternatively be trained on model architectures that are larger or same size as the final runtime model. Each of the M annotation models is preferably trained for a predetermined number of epochs (e.g., iterations of processing the training set) such as to not overfit the training set, but can alternatively be trained until a confidence threshold is met or until another condition is met. The predetermined number of epochs can be determined based on the average change in weights between consecutive epochs less than a threshold, such as to indicate convergence (e.g., less than 0.0001, less than 0.00001, etc.). However, training M annotation models can additionally or alternatively include any other suitable elements.

The method preferably includes determining secondary labels for each image of the image set using the M trained annotation models S500, which can function to re-label the images (e.g., of the image set, such as all images, a subset of images, etc.; different images, etc.) with secondary labels using the M annotation models (e.g., trained annotation models). These secondary labels can be used to determine the final labels in S600. Each image can be labeled by each of the M annotation models (or a subset thereof) to generate S label votes (secondary labels) associated with the label for a given image. S can be equal to M, less than M, equal to or less than N, equal to or less than K (number of orders), 1, 0, more than 2, a plurality, equal to M−1, and/or any other suitable value. Optionally, each image can be labelled by a subset of the M trained annotation models (e.g., the models that were not trained using the respective image, a randomly selected subset of trained annotation models, etc.). Each label vote can optionally be associated with confidence score (e.g., value between 0-1, value between 0-100, etc.) determined by the annotation model. However, the secondary labels can be otherwise determined.

Determining final labels for the image set S600 functions to determine a training label for a given image that can be used for training the runtime model in S700. The final labels can be determined by manual labelers (e.g., crowdsourced labelers such as using mechanical turk, Revolt, etc.), automatic labelers such as the unsupervised learning algorithms of the annotation system, the trained annotation models, and/or any other suitable labeler. The final labels can be determined based on the secondary labels (e.g., from S500), the initial label (e.g., from S200), and/or any other information.

In a first variant, the final labels can be determined based on agreement between a threshold number of secondary labels and optionally the initial label for a respective image, which functions to determine the final label to be used in training the runtime model for a given image. The secondary labels can be considered to agree if: more than a threshold number or percentage of the secondary labels are the same (e.g., majority, quorum, supermajority, over 85%, over 90%, over 95%, over 98%, etc.), which can be determined empirically, heuristically, and/or using other suitable techniques; the confidence scores associated with the secondary labels exceed a predetermined threshold (e.g., 0.7, 0.8, 0.9, 0.95, 0.98, etc.); and/or otherwise determined. For example, the final label can be the label with the majority label votes.

In a second variant, the final label can be the secondary label with the highest aggregate confidence score (e.g., determined by combining confidence scores of label votes associated with the same label).

In a third variant, the final label can be the secondary labels associated with a set of the highest aggregate confidence scores (e.g., 2 highest, 3 highest, 4 highest, etc.)

In a fourth variant, the secondary labels can be the class labels associated with aggregate confidence scores above a threshold (e.g., 0.25, 0.3, 0.4, 0.45, etc.).

Determining the final labels can include identifying ambiguous images, which can be images that cannot be reliably labeled by the trained annotation models, and need to be relabeled (e.g., for a third time). The ambiguous images can be identified based on the associated ambiguity level, (e.g., training image ambiguity levels, such as least, medium, most), based on disagreements between the secondary labels for the respective image, based on nonagreement or a tie between the secondary labels, and/or otherwise determined. Ambiguity levels can be determined based on disagreement between a threshold number of secondary labels, based on the confidence scores of the secondary labels for the image (e.g., be a mean or median of the confidence scores), and/or be otherwise determined. The secondary labels can be considered to disagree if: less than a threshold number or percentage of the secondary labels are the same (e.g., minority, super minority, etc.); more than a threshold number or percentage of the secondary labels disagree; the confidence scores associated with the secondary labels fall below a predetermined threshold; and/or otherwise determined. Alternatively, ambiguous images can be identified as images in the bottom percentile of vote agreements (e.g., bottom 10%, 20%, 30%, 40%, etc.) or otherwise identified.

After identifying ambiguous images, determining the final labels can include determining a tertiary label for the ambiguous images (e.g., final label, more accurate label, etc.) using auxiliary information, which functions to relabel the ambiguous images a third time. However, tertiary labels can be identified for all of the images, another subset of images, and/or any other suitable set of images. The tertiary label is preferably manually determined (e.g., by a human worker, such as a crowdsourced labeler, by a specialist, by querying a source of truth, etc.), but can be determined automatically, by a higher-accuracy model, determined by an automatic labeler (e.g., that selects the tertiary label based on the label votes, the confidence scores, the accuracy of the respective models, or other data), determined by querying a source of truth (e.g., querying the user that generated the ambiguous image for what food they made, what sheet pan type they used, etc.), or otherwise determined. Auxiliary information can be provided with the image to facilitate more accurate labeling. Examples of auxiliary information that can be provided include: the top secondary labels or classifications for the image (e.g., secondary labels with the most votes, the secondary labels with the highest confidence scores, etc.); the respective confidence scores; ambiguity levels; and/or other auxiliary information.

For example, the ambiguous image (e.g., raw or processed), the two highest-agreement associated secondary labels, and/or other auxiliary information (e.g., reference images for different classes) can be provided to a human labeler for higher-accuracy labeling.

Figure 6:
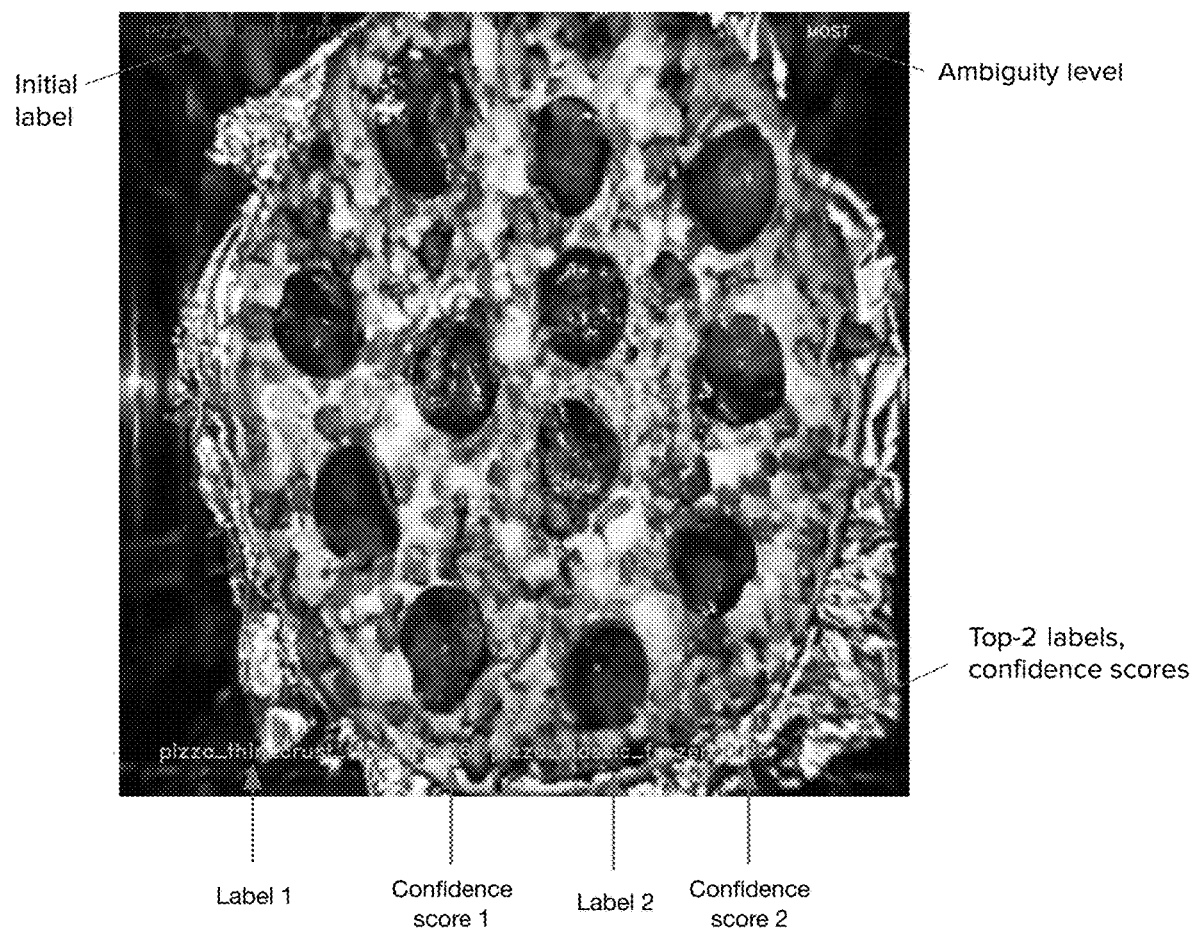
FIG. 6 is a specific example of a training image and auxiliary information used for determining final labels in S600.

In an illustrative example, depicted in FIG. 6, the auxiliary information can be overlaid on the training image. The auxiliary information includes the initial label (e.g., from S200), an ambiguity level, and the two top secondary labels (based on the confidence scores) and the associated confidence scores.

Additionally or alternatively, determining final labels can include discarding or ignoring the ambiguous images from the training data (e.g., when more than a predetermined number of secondary labels disagree for an image, such as more than 3, 4, 5, 6, 7, 8, 9, 10, 15, 20, etc.), such that the runtime model is not trained using ambiguous images. This can reduce labeling errors in the training set of the final runtime model, thereby improving its classification accuracy.

In a first variant, the final label can be determined for an image when secondary label disagreement is above a first threshold; and removing the image from the training set when secondary label disagreement is above a second threshold (e.g., wherein the second threshold is greater than the first threshold).

However, determining final labels can additionally or alternatively include any other suitable elements.

The method optionally includes training one or more runtime models using the image set associated with final labels S700, which can function to train a runtime model to achieve higher accuracy using the set of images and the final labels than for example a runtime model trained using the set of images and the initial labels. The one or more runtime models are preferably used for multi class classification between different classes of a class group, but can additionally or alternatively be used for multi class classification between different classes of multiple class groups. In a first variation, the method can include determining multiple runtime models: a first runtime model for pan fullness, a second runtime model for food class, and a third runtime model for accessory type. In a second variation, the method can include using a single runtime model for pan fullness, food class, and accessory type.

The one or more runtime models are preferably neural networks (e.g., DNN, CNN, RNN, transformer, feed forward, etc.) with the same architecture as the annotation models, but can additionally or alternatively be modified or different. The runtime models can alternatively be any of the models discussed above. The one or more runtime models can be deployed to one or more appliances (e.g., fleet of appliances) using the communication system. Training the one or more runtime models can be performed using the training system, and more specifically using one or more of the optimization algorithms of the training system. However, training a runtime model can additionally or alternatively include any other suitable elements.

The method optionally includes using the runtime model S800, which can function to use the trained runtime model to perform inference (e.g., deploying and using the runtime model at one or more appliances). Using the runtime model can be performed after training the runtime model in S700 and/or performed at any other suitable time. The runtime model is preferably used at the appliance (e.g., the same or different appliance that generated the training image set), but can additionally or alternatively be used at a user device, at the remote computing system, or at any other suitable computing system.

In a first variant, using the runtime model can include, at the appliance, after training the runtime model, subsequently using the runtime model to classify new images of ambiguous objects.

In a second variant, using the runtime model can include selecting an operation program (e.g., food program) based on a determined classification; optionally receiving user confirmation or selection; and operating the appliance according to the operation program. However, using the runtime model can additionally or alternatively include any other suitable elements.

Different subsystems and/or modules discussed above can be operated and controlled by the same or different entities. In the latter variants, different subsystems can communicate via: APIs (e.g., using API requests and responses, API keys, etc.), requests, and/or other communication channels.

An alternative embodiment preferably implements the above methods in a computer-readable medium storing computer-readable instructions. The instructions are preferably executed by computer-executable components preferably integrated with the system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device. The computing systems disclosed above can include one or more physical processors (e.g., CPU, GPU, microprocessors, ASICs, etc.) and/or other computer-executable component or hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for ambiguous object classification, comprising:
    receiving an image set, wherein each image of the image set is labeled with a noisy label of an ambiguous object class;
    partitioning the image set into N training sets;
    training annotation models using the N training sets;
    generating a set of secondary labels for each image of the image set using the trained annotation models; and
    determining a final label for images of the image set based on the respective set of secondary labels, wherein when more than a threshold number of secondary labels disagree for a given image, determining the final label for the image comprises facilitating reannotation of the image, wherein facilitating reannotation of the image comprises providing the image, a first secondary label with a highest confidence score, and a second secondary label with a second highest confidence score, to a manual labeler; and receiving the final label for the image from the manual labeler.

2. The method of claim 1, wherein the N training sets are split into K orders, wherein each order comprises all images of the image set.

3. The method of claim 2, wherein training sets belonging to the same order are non-overlapping.

4. The method of claim 2, wherein training sets belonging to the same order are the same size.

5. The method of claim 1, further comprising training a runtime model using the image set associated with the final labels.

6. The method of claim 5, further comprising:
    selecting an operation program based on a determined classification from the runtime model; and
    operating an appliance according to the operation program.

7. The method of claim 1, wherein the image set is received from a set of appliances.

8. The method of claim 1, wherein the image set comprises images that depict a view from above a scene.

9. The method of claim 1, wherein the ambiguous object class comprises a food type.

10. The method of claim 1, wherein each of the annotation models is trained using a different training set of the N training sets.

11. The method of claim 1, wherein the set of secondary labels for a given image is generated using the trained annotation models that were not trained using the image.

12. The method of claim 1, further comprising removing an image from the image set when more than a second threshold number of secondary labels for the image disagree.

13. The method of claim 1, wherein the final label for a given image is determined based on a majority vote between the secondary labels within the set of secondary labels for the image.

14. A non-transitory computer-readable storage medium storing instructions that, when executed by a processing system, cause the processing system to perform a method comprising:
    receiving an image set, wherein each image of the image set is labeled with a noisy label of an ambiguous object class;
    partitioning the image set into N training sets;
    training annotation models using the N training sets;
    generating a set of secondary labels for each image of the image set using the trained annotation models;
    determining a final label for each image based on the respective set of secondary labels, wherein when more than a threshold number of secondary labels disagree for a given image, determining the final label for the image comprises facilitating reannotation of the image, comprising:
        providing the image, a first secondary label with a highest confidence score, and a second secondary label with a second highest confidence score, to a manual labeler; and
        receiving the final label for the image from the manual labeler; and
    training a runtime model using the image set and the final labels.

15. The non-transitory computer-readable storage medium of claim 14, wherein the method further comprises:
    receiving an inference image from an appliance;
    selecting an operation program based on a determined classification for the inference image from the runtime model; and
    operating the appliance according to the operation program.

16. The non-transitory computer-readable storage medium of claim 14, wherein the N training sets are split into K orders, wherein each order comprises all images of the image set.

17. The non-transitory computer-readable storage medium of claim 14, wherein the final label for a given image is determined based on agreement between a second threshold number of secondary labels for the image.

* * * * *